UNITED STATES PATENT OFFICE.

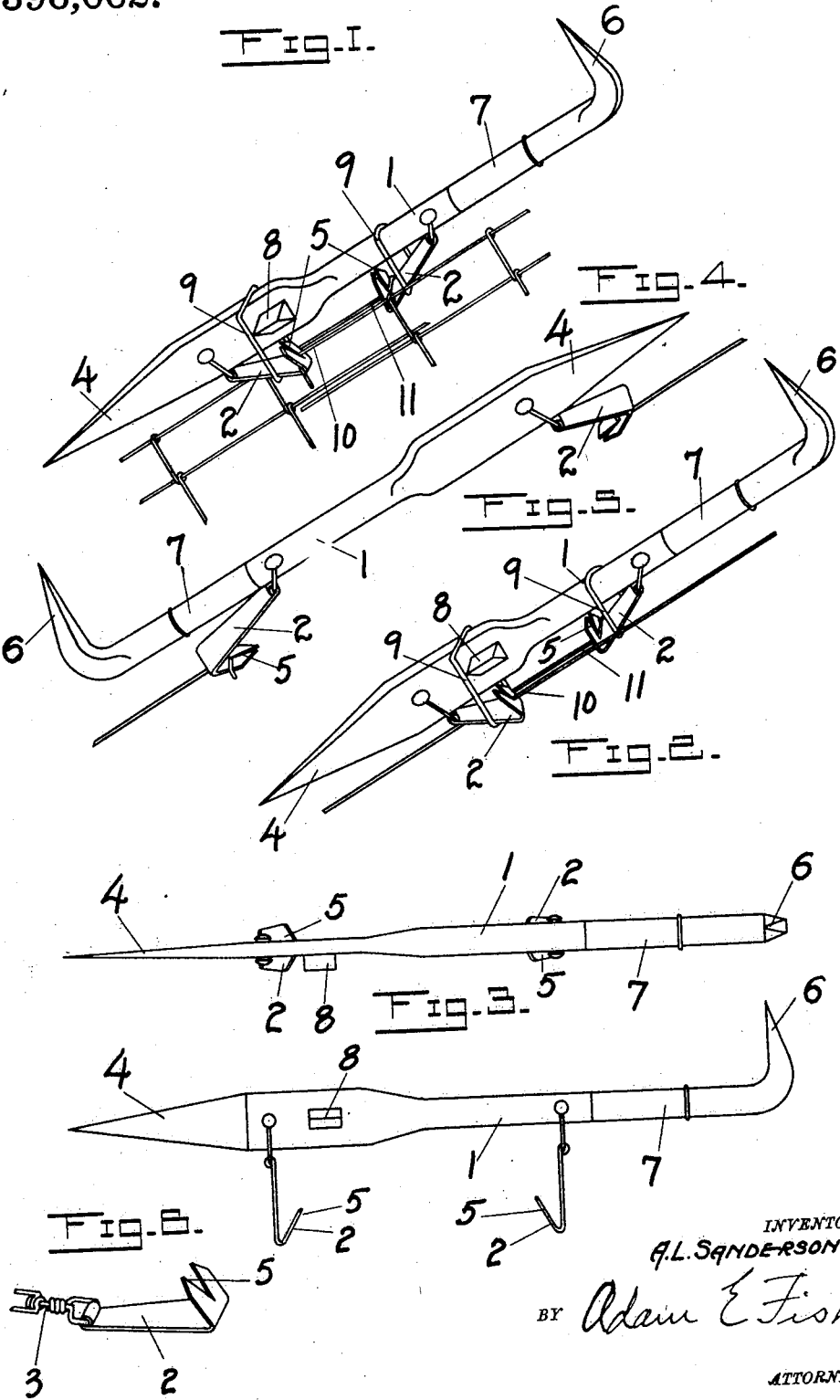

AUTHER L. SANDERSON, OF PALUXY, TEXAS.

WIRE-STRETCHER.

1,396,062.

Specification of Letters Patent.   Patented Nov. 8, 1921.

Application filed March 16, 1921. Serial No. 452,819.

*To all whom it may concern:*

Be it known that I, AUTHER L. SANDERSON, a citizen of the United States, residing in the city of Paluxy and State of Texas, have invented new and useful Improvements in Wire-Stretchers, of which the following is a specification, reference being had to the accompanying drawings.

This invention relates to wire stretchers and splicers, and the main object is to provide a simple, strong, practical and efficient device to facilitate the stretching and splicing of fence wire or the like.

Another object is to afford handy means for pulling the staples of fence wires, and for cutting such wires.

In the drawings—

Figure 1 is a perspective showing the apparatus as in use upon a fence for stretching and splicing the fence wire;

Fig. 2 is a top or plan view of the device itself;

Fig. 3 is a side elevation;

Fig. 4, a perspective showing the tool as located upon the two opposite ends of the broken wire for the purpose of splicing same;

Fig. 5, a similar view after the ends have been drawn together by the tool ready for splicing;

Fig. 6 is a detail showing the method of constructing the individual wire hooks.

The tool consists of a main lever bar 1, depending from the lower end of which are a plurality of spaced wire hooks 2. These wire hooks 2 may have swivel connecting links 3 by which they are connected to the lever bar 1. This method of mounting facilitates the manipulation of the apparatus in use. Two of such hooks will usually be found sufficient for ordinary splicing and stretching, but additional hooks may be added if desired for certain classes of work. One end of the main lever bar 1 may be formed into a crotch 4, same being alined with the crotches 5 of the wire hooks 2. This crotch 4 is found of use in certain classes of work. Upon the opposite end of the lever bar 1 is demountably attached a staple pull 6, a ferrule 7 frictionally connecting same to the lever bar 1. An edged wire cutter 8 is rigidly attached to one side of the lever bar 1 for the purpose of facilitating the cutting of wire. Sliding rings as 9 are adapted to slidingly encircle the lever bar 1, and these rings may be slid down along said main lever bar over the shanks of the wire hooks 2 to prevent the hooks from returning to their original straight-away position under the pull of the wires after the ends thereof have been stretched together for splicing.

In operation, the wire hooks engage the opposite ends 10 and 11 of the wire to be stretched and spliced, the wire passing into the crotches 5, and thus being held securely. The bar 1 is then twisted or turned end for end, thus drawing the ends 10 and 11 of the wire past one another, after which the rings 9 may be slid down over the wire hooks 2, thus holding the apparatus in fixed position while the splice is being made.

While I have herein described a certain specific manner and method of constructing and assembling the elements of my invention, it is understood that I may vary from the same in minor details, not departing from the spirit of my invention, so as best to construct a practical device for the purpose intended as defined in the appended claims.

What I claim to be new and patentable is:

1. A wire stretcher, comprising a main lever bar; a plurality of spaced wire engaging hooks pivotally depending from one edge of said main lever bar, and adapted to grip the ends of the wire so as to draw same together when the lever bar is turned; and rings encircling the main lever bar and adapted to slide over the shanks of the wire hooks to hold the same in set position under the pull of the wires, so as to facilitate the splicing of said wires.

2. A wire stretcher, comprising a main lever bar; a wire engaging crotch formed in one end of the lever bar; a plurality of spaced wire engaging hooks pivotally depending from one edge of said main lever bar, and adapted to grip the ends of the wire so as to draw same together when the lever bar is turned; and rings encircling the main lever bar and adapted to slide over the shanks of the wire hooks to hold the same in set position under the pull of the wires, so as to facilitate the splicing of said wires.

3. A wire stretcher, comprising a main lever bar; a staple pull detachably mounted on one of end of the bar; a plurality of spaced wire engaging hooks pivotally depending from one edge of said main lever bar, and adapted to grip the ends of the wire so as to draw same together when the lever bar is turned; and rings encircling the main lever bar and adapted to slide over the shanks of the wire hooks to hold the same in set position under the pull of the wires, so as to facilitate the splicing of said wires.

AUTHER L. SANDERSON.

Witnesses:
E. B. McGOWAN,
J. A. TIDWELL.